US009213385B2

(12) United States Patent
Berke et al.

(10) Patent No.: US 9,213,385 B2
(45) Date of Patent: Dec. 15, 2015

(54) SUPPLEMENTAL POWER SYSTEM FOR POWER EXCURSIONS (71) Applicant: Dell Products L.P., Round Rock, TX (US)

(72) Inventors: Stuart Allen Berke, Austin, TX (US); George G. Richards, III, Round Rock, TX (US); Mark Muccini, Georgetown, TX (US)

(73) Assignee: Dell Products L.P., Round Rock, TX (US)

( * ) Notice: Subject to any disclaimer, the term of this patent is extended or adjusted under 35 U.S.C. 154(b) by 0 days.

(21) Appl. No.: 14/691,250

(22) Filed: Apr. 20, 2015

(65) Prior Publication Data

US 2015/0227184 A1 Aug. 13, 2015

Related U.S. Application Data (63) Continuation of application No. 13/651,903, filed on Oct. 15, 2012, now abandoned.

(51) Int. Cl.
*G06F 9/00* (2006.01)
*G06F 1/28* (2006.01)
*G06F 13/42* (2006.01)

(52) U.S. Cl.
CPC .............. *G06F 1/28* (2013.01); *G06F 13/4221* (2013.01)

(58) Field of Classification Search
CPC ........ G06F 1/263; G06F 1/28; G06F 13/4221
USPC ........................................................ 713/100
See application file for complete search history.

(56) References Cited

U.S. PATENT DOCUMENTS

| 5,638,540 | A | 6/1997 | Aldous |
| 5,754,868 | A | 5/1998 | Yamamoto et al. |
| 6,363,450 | B1 * | 3/2002 | Lash et al. ..................... 710/301 |
| 6,455,953 | B1 | 9/2002 | Lam |
| 6,460,094 | B1 * | 10/2002 | Hanson et al. ..................... 710/8 |
| 6,856,047 | B2 | 2/2005 | Murabayashi et al. |
| 6,971,004 | B1 * | 11/2005 | Pleis et al. ..................... 713/100 |
| 7,003,620 | B2 | 2/2006 | Avraham et al. |

(Continued)

OTHER PUBLICATIONS

Karunakar P. Reddy; "Systems and Methods for Providing Supplemental Power to Battery Powered Information Handling Systems;" Filed on Jun. 13, 2012, U.S. Appl. No. 13/495,631; 37 Pages.

*Primary Examiner* — Mark Connolly
(74) *Attorney, Agent, or Firm* — Haynes and Boone, LLP (57) ABSTRACT A supplemental power system includes a powered component, a removable module interface with a plurality of pins, and a plurality of system connections. A system controller detects a first type removable module coupled to the removable module interface and allows signals from the system connections to be transmitted to the first type removable module through the plurality of pins. The system controller detects a second type removable module coupled to the removable module interface and allows power from the second type removable module that is received through the plurality of pins to be transmitted to the powered component while not allowing signals from the system connections to be transmitted to the second type removable module through the plurality of pins. Power that is stored in the second type removable module may be provided to the powered component in response to a detected power excursion by the powered component.

20 Claims, 7 Drawing Sheets

(56) References Cited

U.S. PATENT DOCUMENTS

| | | |
|---|---|---|
| 7,394,167 B2 | 7/2008 | Ross |
| 7,474,879 B2 | 1/2009 | Turner et al. |
| 8,065,507 B2 * | 11/2011 | Asano .......................... 713/100 |
| 8,209,553 B2 * | 6/2012 | Kamepalli et al. ................ 713/1 |
| 8,384,244 B2 | 2/2013 | Peterson et al. |
| 8,479,032 B2 | 7/2013 | Trantham et al. |
| 8,793,518 B2 | 7/2014 | Reddy |
| 2005/0182986 A1 | 8/2005 | Anderson et al. |
| 2006/0174047 A1 * | 8/2006 | Carty ............................ 710/305 |
| 2010/0123435 A1 | 5/2010 | Piazza et al. |
| 2010/0257529 A1 | 10/2010 | Wilkerson et al. |
| 2011/0302432 A1 | 12/2011 | Harris et al. |
| 2014/0108846 A1 | 4/2014 | Berke et al. |

\* cited by examiner

SUPPLEMENTAL POWER SYSTEM FOR POWER EXCURSIONS

CROSS REFERENCE TO RELATED APPLICATIONS

The present application is a Continuation application of U.S. Utility application Ser. No. 13/651,903, filed on Oct. 15, 2012, the disclosure which is incorporated herein by reference.

BACKGROUND

The present disclosure relates generally to information handling systems, and more particularly to supplemental power system for power excursions by an information handling system.

As the value and use of information continues to increase, individuals and businesses seek additional ways to process and store information. One option is an information handling system (IHS). An IHS generally processes, compiles, stores, and/or communicates information or data for business, personal, or other purposes. Because technology and information handling needs and requirements may vary between different applications, IHSs may also vary regarding what information is handled, how the information is handled, how much information is processed, stored, or communicated, and how quickly and efficiently the information may be processed, stored, or communicated. The variations in IHSs allow for IHSs to be general or configured for a specific user or specific use such as financial transaction processing, airline reservations, enterprise data storage, or global communications. In addition, IHSs may include a variety of hardware and software components that may be configured to process, store, and communicate information and may include one or more computer systems, data storage systems, and networking systems.

The power requirements of IHSs are steadily increasing. For example, as processors have added cores and other processing features, the sustainable power requirements, dynamic power requirements, and peak power requirements of the power system have increased. Traditionally, processor thermal design power (TDP) has been used for sustainable power requirement budgeting purposes, and only a small amount of additional power was budgeted for dynamic power requirements and peak power requirements that are above the TDP of the processor. However, as the number of processor cores has increased (from 1, to 2, to 4, to 8, and to 10 and higher), the ability of all cores to simultaneously transition from an idle state to an active state has driven the dynamic power requirements and peak power requirements rapidly relative to the sustainable power requirements. For example, maximum or peak power ("$P_{max}$") has grown from 1.3×TDP, to 1.6×TDP, and up to 2.2×TDP, and dynamic power ("$P_{dyn}$", typically sustainable on the order of milliseconds to seconds) has grown from 1.0×TDP, to 1.2×TDP, to 1.6×TDP for some processors in the last 5 years. Processor cores and other computing elements can activate on the order of nanoseconds, which is orders of magnitude faster than conventional monitoring and throttling mechanisms can respond.

Worst case theoretical dynamic power requirements and peak power requirements are typically determined to describe all possible processor usage models, including those that are very unlikely or that may only be realized by a small subset of users and applications. For example, worst case theoretical requirements may consider a small subset of the processor instruction set that is only used in specific high performance computing (HPC) workloads, "thermal virus" level code segments that require micro-architectural knowledge to generate, worst case processor operating parameters (e.g., worst case voltage, temperature, process, etc.), 100% processor/system utilization (typical utilization is between 30-70%), and/or a variety of other worst case scenarios known in the art. As these worst case theoretical dynamic power requirements and peak power requirements have grown, the difference between the actual or measured dynamic power requirements and peak power requirements and those worst case theoretical requirements has grown as well.

Furthermore, denser systems are requiring more and more from the power system. Conventional servers today have 2 to 4 processors, with newer designs having 4 to 8 processors and some emerging architectures having dozens of processors. Other computing elements such as, for example, memory, graphics controllers, co-processors, network controllers, drives, etc., are also dramatically increasing their dynamic and peak power requirements compared to their "TDP" or sustainable power requirements. These other computing elements may have dynamic and peak power requirements that have substantially different durations and duty cycles than those required by processors. As the number of processors and other high-power devices in the system grows, it becomes less and less feasible to budget the power system based on theoretical dynamic power requirements and peak power requirements, as those theoretical requirements drive excessive power systems that are costly, inefficient, and difficult (if not impossible) to implement.

Accordingly, it would be desirable to provide an improved power system for an IHS.

SUMMARY

According to one embodiment, an information handling system (IHS) includes a processing system; a removable module interface that includes a plurality of pins that are configured to couple to a removable module; a selector device that is coupled to the processing system and the first removable module interface; and a system controller that is coupled to the first removable module interface and the selector device, wherein the system controller is configured to: detect that a first type removable module has been coupled to the first removable module interface and, in response, configure the selector device to allow signals sent from the processing system to be transmitted to the first type removable module through the plurality of pins on the first removable module interface; detect that a second type removable module has been coupled to the first removable module interface that is different than the first type removable module and, in response, configure the selector device to allow power that is stored in the second type removable module and received through the plurality of pins on the first removable module interface to be transmitted to the processing system; and in response to a detected power excursion by the processing system, provide power that is stored in the second type removable module and received through the plurality of pins on the removable module interface to the processing system.

DETAILED DESCRIPTION

For purposes of this disclosure, an IHS may include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, entertainment, or other purposes. For example, an IHS may be a personal computer, a PDA, a consumer electronic device, a display device or monitor, a network server or storage device, a switch router or other network communication device, or any other suitable device and may vary in size, shape, performance, functionality, and price. The IHS may include memory, one or more processing resources such as a central processing unit (CPU) or hardware or software control logic. Additional components of the IHS may include one or more storage devices, one or more communications ports for communicating with external devices as well as various input and output (I/O) devices, such as a keyboard, a mouse, and a video display. The IHS may also include one or more buses operable to transmit communications between the various hardware components.

Figure 1:
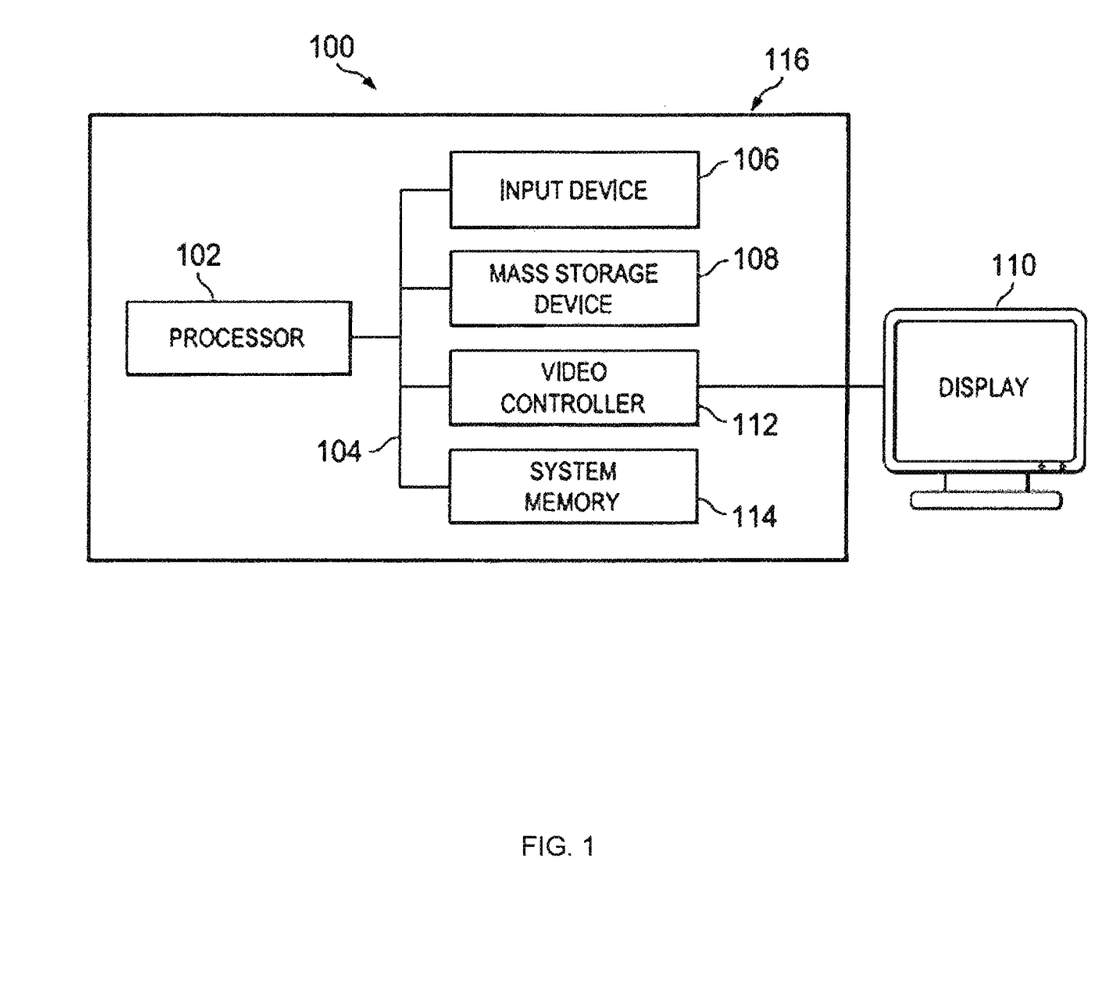
FIG. 1 is a schematic view illustrating an embodiment of an information handling system.

In one embodiment, IHS 100, FIG. 1, includes a processor 102, which is connected to a bus 104. Bus 104 serves as a connection between processor 102 and other components of IHS 100. An input device 106 is coupled to processor 102 to provide input to processor 102. Examples of input devices may include keyboards, touchscreens, pointing devices such as mouses, trackballs, and trackpads, and/or a variety of other input devices known in the art. Programs and data are stored on a mass storage device 108, which is coupled to processor 102. Examples of mass storage devices may include hard discs, optical disks, magneto-optical discs, solid-state storage devices, and/or a variety other mass storage devices known in the art. IHS 100 further includes a display 110, which is coupled to processor 102 by a video controller 112. A system memory 114 is coupled to processor 102 to provide the processor with fast storage to facilitate execution of computer programs by processor 102. Examples of system memory may include random access memory (RAM) devices such as dynamic RAM (DRAM), synchronous DRAM (SDRAM), solid state memory devices, and/or a variety of other memory devices known in the art. In an embodiment, a chassis 116 houses some or all of the components of IHS 100. It should be understood that other buses and intermediate circuits can be deployed between the components described above and processor 102 to facilitate interconnection between the components and the processor 102.

Figure 2:
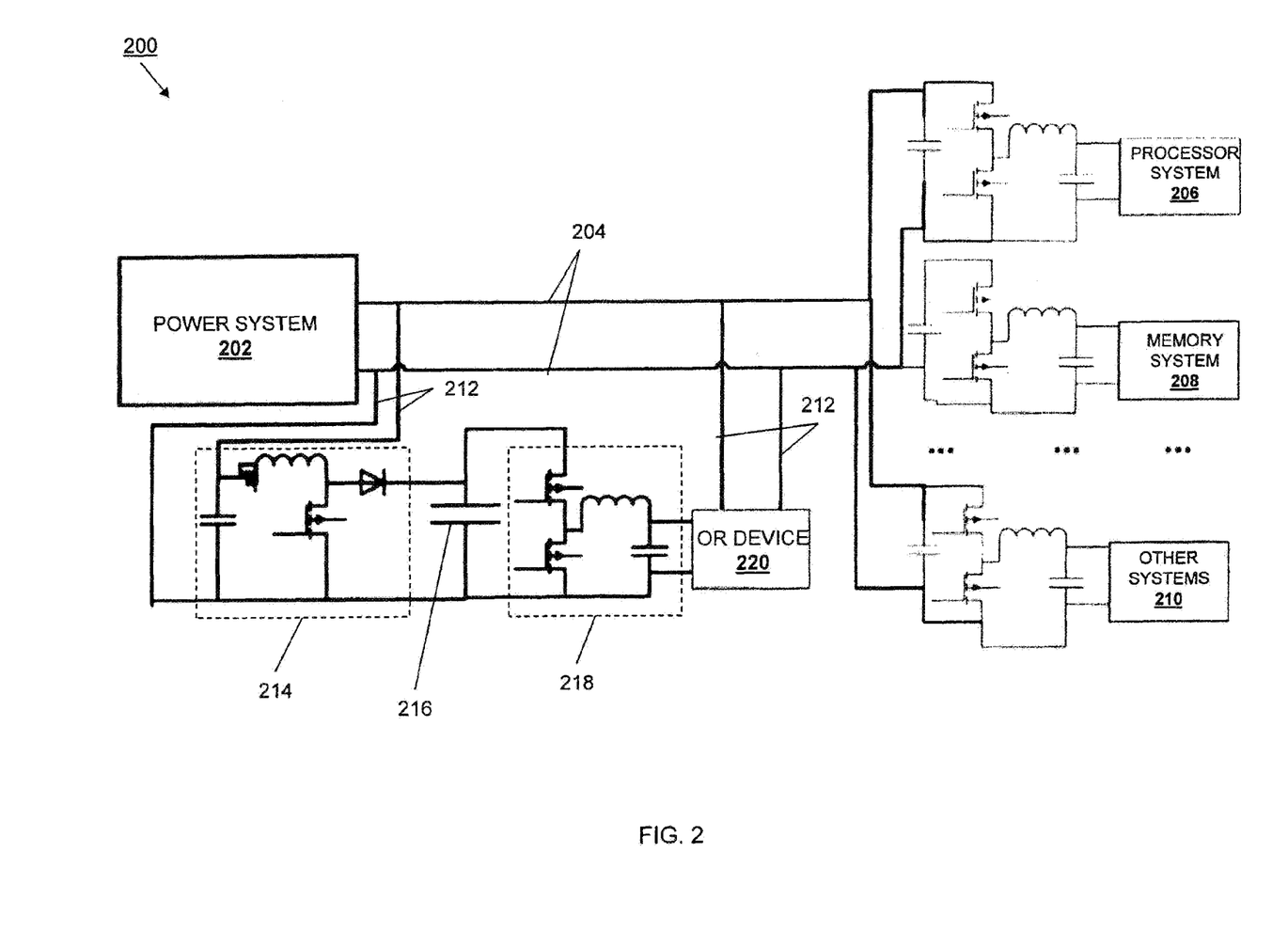
FIG. 2 is a schematic view illustrating an embodiment of a supplemental power system.

Referring now to FIG. 2, an embodiment of a supplemental power system 200 is illustrated. As discussed in further detail below, the supplemental power system 200 may be implemented in or with a variety of IHS's known in the art. For example, the supplemental power system 200 may be implemented as part of the IHS 100, discussed above with reference to FIG. 1, which may include a server IHS, a desktop IHS, a laptop IHS, a tablet IHS, a mobile phone IHS, and/or a variety of similar IHSs known in the art. In another example, the supplemental power system 200 may be implemented as a modular IHS such as, for example, a blade server. As such, in some embodiments, all of the elements in the supplemental power system 200 may be housed in an IHS chassis (e.g., the chassis 116 discussed above with reference to FIG. 1), while in other embodiments, elements of the supplemental power system 200 may be coupled to the IHS (e.g., a plurality of modular IHSs may be coupled to the power system that may include any combination of power supply units (PSUs), power distribution units (PDUs), and/or any a variety of other power system components known in the art, discussed in further detail below.) Thus, a wide variety of modification to the specific embodiments discussed below is envisioned as falling within the scope of the present disclosure, including but not limited to distribution of the components across one or more IHSs.

The embodiment of the supplemental power system 200 illustrated in FIG. 2 utilizes a parallel power conversion stage that provides supplemental power to one or more system loads during dynamic and/or peak power excursions by powered components in the supplemental power system 200. One of skill in the art will recognize that, in some embodiments, the provisioning of supplemental power only during dynamic and/or peak power excursions provides a limited impact on total power efficiency of the supplemental power system 200 from the average power consumed by the parallel power conversion stage. The supplemental power system 200 includes a power system 202 that may include any number or combination of power supply units (PSUs), power distribution units (PDUs), and/or other power system components known in the art. The power system 202 is coupled to a first power supply path 204 that, in the embodiment discussed below, includes a main power rail between the power system 202 and a plurality of powered components. In the illustrated embodiment, the plurality of powered components include a processor system 206, a memory system 208, and other powered component systems 210. The power system 202 is operable to supply power at a first voltage over the first power supply path 204 to the powered components. For example, the power system 202 may include components that provide power at approximately 12 volts to the powered components. The power system 202 also includes a second power supply path 212 that is coupled in parallel to the first power supply path 204 such that the second power supply path 212 is also connected to the processor system 206, a memory system 208, and other powered component systems 210. As can be seen in the illustrated embodiment, each of the processor system 206, memory system 208, and other powered component systems 210 may be coupled to a voltage regulator that regulates the voltage received from the power system 202.

The second power supply path 212 includes a boost converter 214 that is operable to increase the voltage of the power provided to the second power supply path 212 through the first power supply path 204 by the power system 202 (at the first voltage) to a second voltage that is greater than the first voltage. For example, the boost converter 214 may include components that are operable to increase the approximately 12 volt power provided by the power system 202 on the first power supply path 204 to approximately 48 volts (or any other suitable voltage such as, for example, within the range of 18 to 48 volts or higher.) A storage device 216 is coupled to the boost converter 214 on the second power supply path 212 and, in the illustrated embodiment, includes a capacitor that is operable to store power received from the boost converter 214 at the second voltage. For example, the storage device 216 may include a capacitor that is operable to store the 48 volt power received from the boost converter 214.

A buck converter 218 is coupled to the storage device 216 on the second power supply path 212 and is operable to down convert the power stored at the second voltage in the storage device 216 back to approximately the first voltage. For example, the buck converter 218 may include components that are operable to receive the approximately 48 volt power stored in the storage device 216 and down convert that power to approximately 12 volts. An OR device 220 is coupled to the buck converter 218 on the second power supply path 212 and, in the embodiment discussed below, includes a diode or FET device that blocks voltage in one direction and that is operable to restrict power from being supplied from the storage device 216 to the powered components over the second power supply path 212 unless a dynamic and/or peak power excursion of at least one of the powered components occurs, discussed in further detail below. For example, the OR device 220 may include components that create a voltage drop that prevents the second power supply path 212/parallel power supply path from delivering power until the voltage of the first power supply path 204/main rail drops enough to cause a voltage differential that allows power to be supplied from the storage device 216 through the second power supply path 212. In an embodiment, FET devices used for the OR'ing function may be controlled by logic monitoring the currents and voltages involved, and in some situations advantageously turning the OR'ing function on and/or off at optimal times.

In an embodiment, the buck converter 218 may include a higher bandwidth than the power system 202 (e.g., a PSU in the power system 202) to allow the second power supply path 212 to be the main power source for the powered components during a dynamic and/or peak power excursion by one or more of the powered components until the power system 202 can respond. For example, a main power system voltage (e.g., 12 volts) could droop low as a result of a high dynamic transient load, or it could be limited by an internal current limit protection mechanism from exceeding a safe operating level. In either case, during this interval, the second power supply path 212 can provide the system with transient peak capability until the main PSU voltage loop corrects the droop and resumes normal operation, or current demand is reduced to within a safe operating level (at which time the second power supply path 212 would discontinue sourcing the transient system load.)

In one example, in the embodiment where the boost converter 214 increases the voltage of the power supplied to the second power supply path 202 to approximately 48 volts and the storage device 216 stores that approximately 48 volt power, approximately 16 times the amount of energy will be stored on the second power supply path 212 relative to the first power supply path 204 at 12 volts. By providing this higher storage capacity in the second power supply path 212 and including a wide input range buck/down converter, dynamic and/or peak power excursions by one or more of the powered components will be supplemented with enough power from the storage device 216 to prevent the power system 202 from entering an over-current protection mode or otherwise exceeding a power system output capability. Once the dynamic and/or peak power excursion by the one or more powered components ceases, the power system 202 will resume providing power to the powered components over the first power supply path 204, and the storage device 216 will be charged at a rate that remains below the power system output capability of the power system 202.

Figure 3:
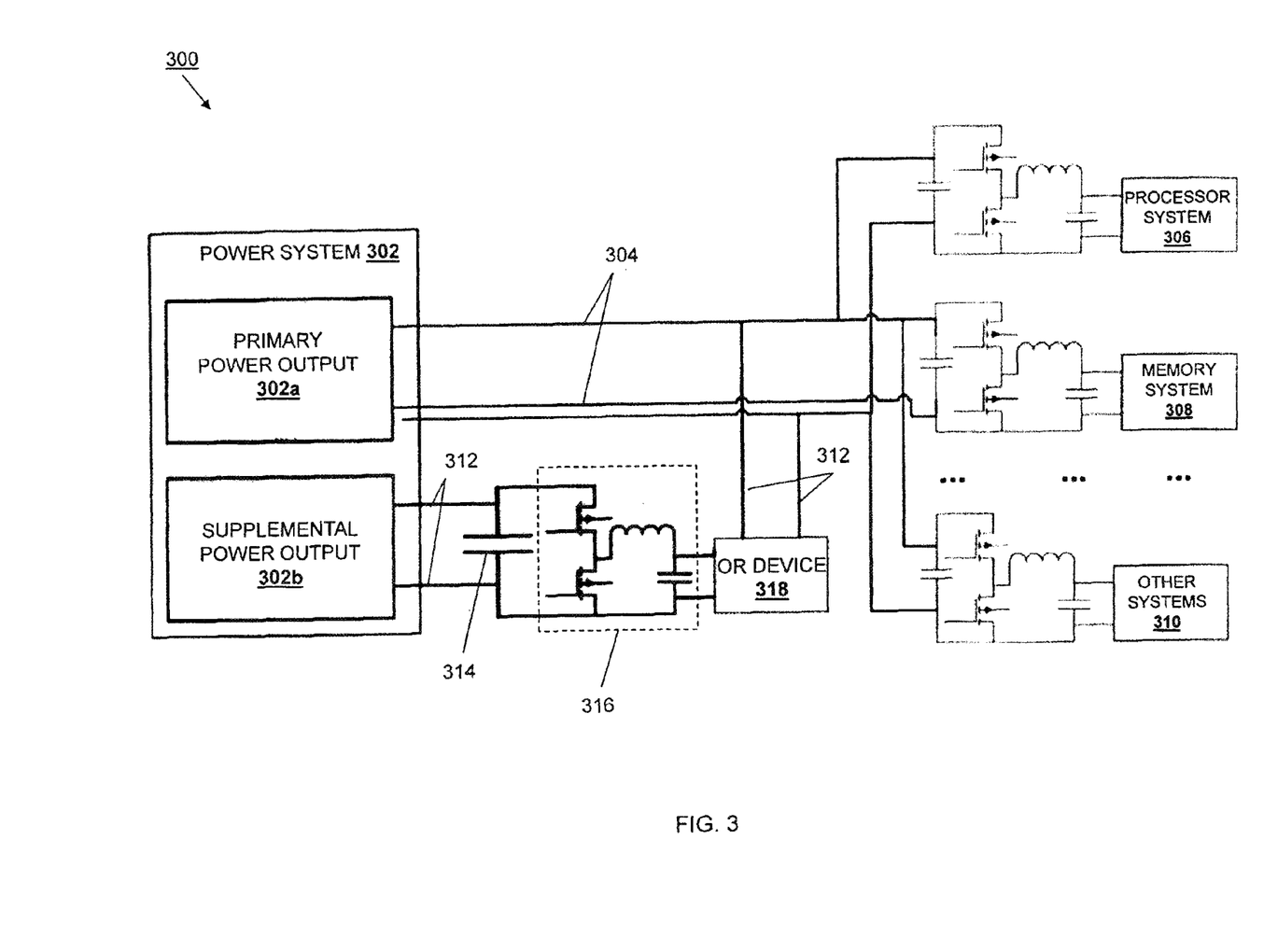
FIG. 3 is a schematic view illustrating an embodiment of a supplemental power system.

Referring now to FIG. 3, an embodiment of a supplemental power system 300 is illustrated. As discussed in further detail below, the supplemental power system 300 may be implemented in or with a variety of IHS's known in the art. For example, the supplemental power system 300 may be implemented as part of the IHS 100, discussed above with reference to FIG. 1, which may include a server IHS, a desktop IHS, a laptop IHS, a tablet IHS, a mobile phone IHS, and/or a variety of similar IHSs known in the art. In another example, the supplemental power system 300 may be implemented as a modular IHS such as, for example, a blade server. As such, in some embodiments, all of the elements in the supplemental power system 300 may be housed in an IHS chassis (e.g., the chassis 116 discussed above with reference to FIG. 1), while in other embodiments, elements of the supplemental power system 300 may be coupled to the IHS (e.g., a plurality of modular IHSs may be coupled to the power system that may include any combination of power supply units (PSUs), power distribution units (PDUs), and/or any a variety of other power system components known in the art, discussed in further detail below.) Thus, a wide variety of modification to the specific embodiments discussed below is envisioned as falling within the scope of the present disclosure, including but not limited to distribution of the components across one or more IHSs.

The embodiment of the supplemental power system 300 illustrated in FIG. 3 utilizes a dedicated supplemental power rail that provides power to a second power supply path for supplying supplemental power to one or more system loads during dynamic and/or peak power excursions by powered components in the supplemental power system 300. The supplemental power system 300 includes a power system 302 that may include any number or combination of power supply units (PSUs), power distribution units (PDUs), and/or other power system components known in the art. In the illustrated embodiment, the power system 302 includes components that provide a primary power output 302a that supplies power at a first voltage to a first power supply path 304. The first power supply path 304 may include a main power rail between the power system 302 and a plurality of powered components. In the illustrated embodiment, the plurality of powered components include a processor system 306, a memory system 308, and other powered component systems 310. In an embodiment, the power system 302 may include components that allow the primary power output 302a to provide power at approximately 12 volts to the powered components over the first power supply path 304/main rail.

The power system 302 also includes components that provide a supplemental power output 302b that supplies power at a second voltage that is greater than the first voltage. For example, the power system 302 may include components that allow the supplemental power output 302b to provide power at approximately 18-48 volts. The second power supply path 304 is coupled in parallel to the first power supply path 304 such that the second power supply path 312 is also connected to the processor system 306, the memory system 308, and the other powered component systems 310. As can be seen in the illustrated embodiment, each of the processor system 306, the memory system 308, and the other powered component systems 310 may be coupled to a voltage regulator that regulates the voltage received from the power system 302.

The second power supply path 312 also includes a storage device 314 that is coupled to the supplemental power output 302b and, in the illustrated embodiment, includes a capacitor that is operable to store power received from the supplemental power output 302b at the second voltage. For example, the storage device 314 may include a capacitor that is operable to store of anywhere from 18-48 volts (or any other voltage output from the supplemental power output 302b) received from the supplemental power output 302b.

The second power supply path 312 includes a voltage regulator 316 that is coupled to the storage device 314 on the second power supply path 312 and that is operable to receive the power stored in the storage device 216 and provide that power to the powered components at the first voltage over the second power supply path 312. For example, the voltage regulator 316 may include components that are operable to receive the approximately 18-48 volt power stored in the storage device 314 and provide that power at approximately 12 volts to the powered components. An OR device 318 (e.g., a diode or FET) is coupled to the voltage regulator 316 on the second power supply path 314 and, in the embodiment discussed below, is operable to restrict power from being supplied from the storage device 314 to the powered components over the second power supply path 312 unless a power excursion of at least one of the powered components occurs, discussed in further detail below. For example, the OR device 318 may include components that create a voltage drop that prevents the second power supply path 312/parallel power supply path from delivering power until the voltage of the first power supply path 304/main rail drops enough to cause a voltage differential that allows power to be supplied from the second power supply path 312. Once the dynamic and/or peak power excursion by the one or more powered components ceases, the power system 302 will resume providing power to the powered components over the first power supply path 304, and the storage device 314 will be charged at a rate that remains below the power system output capability of the power system 302. In an embodiment, FET devices used for the OR'ing function may be controlled by logic that monitors the current and voltages involved, and that may advantageously turn the OR'ing function on and/or off at optimum times.

In some embodiments, the second power supply path 312/supplemental power rail is provided in addition to a standard system main rail and an auxiliary/standby system power rail(s) in an IHS, which is commonly +12 volt auxiliary power, +5 volt auxiliary power, or +3.3 volt auxiliary power. However, in order to reduce the number of power rails supported by the power system 302, in other embodiments the second power supply path 312/supplemental power rail may serve as an energy storage charging rail (as discussed above) as well as a source for a voltage converter that creates the auxiliary/standby system power rail(s) as needed. In such embodiments, the second power supply path 312/supplemental power rail would be active even when the standard system main rail is off or disabled, and additional gating and/or disabling circuits may be provided to remove leakage paths.

Figure 4:
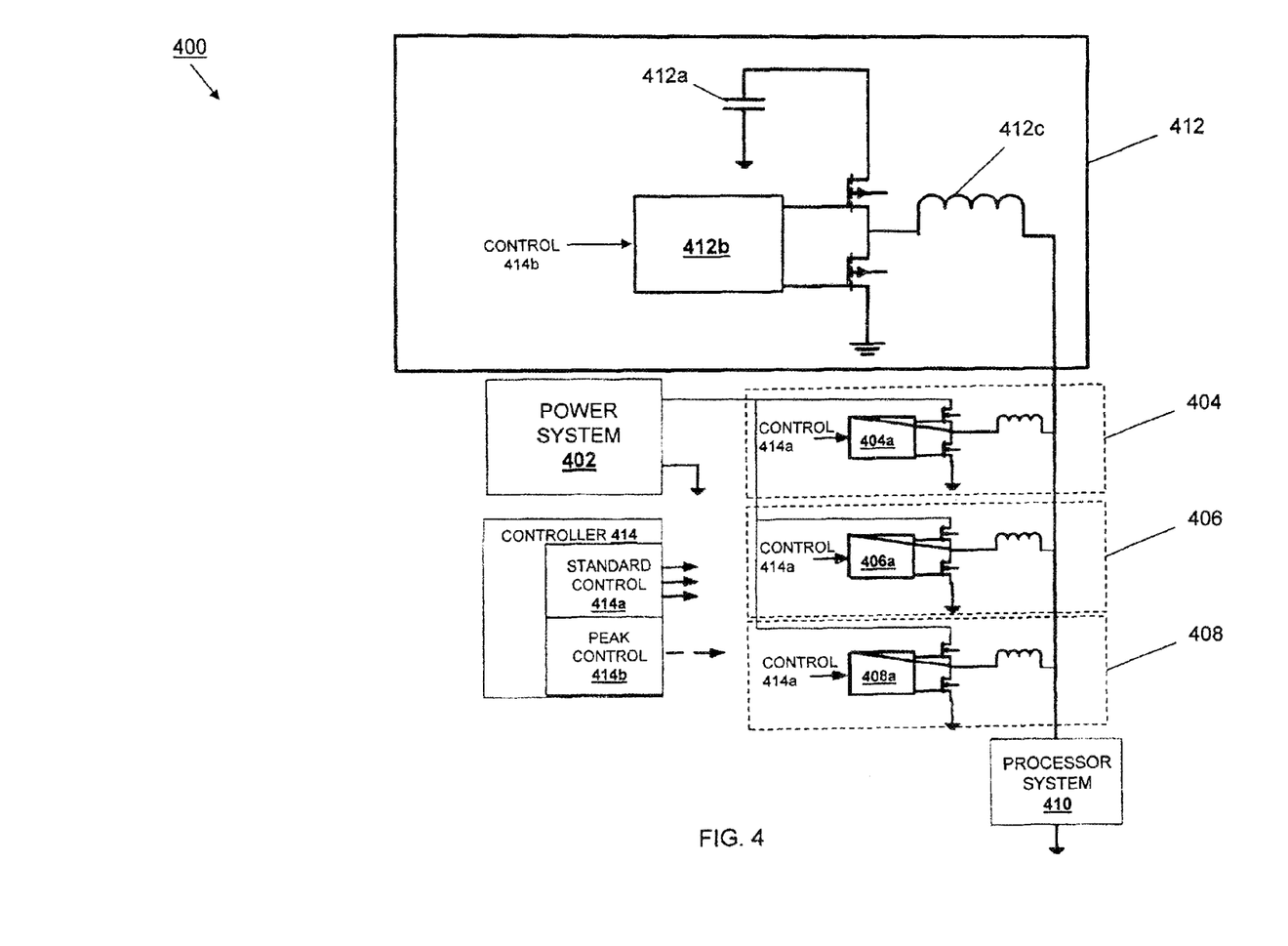
FIG. 4 is a schematic view illustrating an embodiment of a supplemental power system.

Referring now to FIG. 4, an embodiment of a supplemental power system 400 is illustrated. As discussed in further detail below, the supplemental power system 400 may be implemented in or with a variety of IHS's known in the art. For example, the supplemental power system 400 may be implemented as part of the IHS 100, discussed above with reference to FIG. 1, which may include a server IHS, a desktop IHS, a laptop IHS, a tablet IHS, a mobile phone IHS, and/or a variety of similar IHSs known in the art. In another example, the supplemental power system 400 may be implemented as a modular IHS such as, for example, a blade server. As such, in some embodiments, all of the elements in the supplemental power system 400 may be housed in an IHS chassis (e.g., the chassis 116 discussed above with reference to FIG. 1), while in other embodiments, elements of the supplemental power system 400 may be coupled to the IHS (e.g., a plurality of modular IHSs may be coupled to the power system that may include any combination of power supply units (PSUs), power distribution units (PDUs), and/or any a variety of other power system components known in the art, discussed in further detail below.) Thus, a wide variety of modification to the specific embodiments discussed below is envisioned as falling within the scope of the present disclosure, including but not limited to distribution of the components across one or more IHSs.

The embodiment of the supplemental power system 400 illustrated in FIG. 4 utilizes a multi-phase processor voltage regulator that includes one or more additional high voltage phases to provide supplemental power to a processor system 410 during dynamic and/or peak power excursions by one or more processors in the processor system 410. The supplemental power system 400 includes a power system 402 that may include any number or combination of power supply units (PSUs), power distribution units (PDUs), and/or other power system components known in the art. The power system 402 is coupled to a plurality of standard phase devices 404, 406, and 408, and is operable to provide power at a first voltage. For example, the power system 402 may be operable to supply approximately 12 volts of power to each of the standard phase devices 404, 406, and 408. Each of the standard phase devices 404, 406, and 408 include respective field effect transistor (FET) driver integrated circuits (ICs) that allow the standard phase devices 404, 406, and 408 to provide 3 standard phases. For example, each of the standard phase devices 404, 406, and 408 are coupled to a processor system 410, and together are operable to provide 3 standard 12 volt phases from the power system 402 to the processor system 410 during normal steady-state operation of the processor system 410. One of skill in the art will recognize that, in some embodiments, buck voltage regulator phases may be provided as parallel power stages (i.e. FETs and inductors) that operate in an interleaved configuration to improve performance and efficiency.

The supplemental power system 400 also includes a peak phase device 412 that includes a storage device 412a, a FET driver IC 412b, and an inductor 412c, and that is operable to provide supplemental power during dynamic and/or peak power excursions by the processor system 410. The storage device 412a is operable to store power from the power system 402 at a second voltage that is greater than the first voltage supplied by the power system 402. For example, the storage device 412a may include a capacitor that is operable to store approximately 18-48 volts of power provided by the power system 402. In some embodiments, a boost regulator may step up the voltage provided to the storage device 412a or the PSU may have a second higher voltage rail output to the storage device 412a, similarly as discussed above. The supplemental power system 400 also includes a controller 414 that provides standard control 414a to each of the FET driver ICs 404a, 404b, and 404c in the standard phase devices 404, 406, and 408, and peak control 414b to the FET driver IC 412b in the peak phase device 412. In an embodiment, the controller 414 includes a processor system voltage regulator for the processor system 410. For example, the controller 414 may be a pulse width modulation (PWM) controller in the processor system voltage regulator that is operable to provide processor system voltage regulator controller standard phase control and peak transient phase control.

In an embodiment, the peak phase device 412 includes components that allow the peak phase device 412 to operate at a higher voltage than the standard phase devices 404, 406, and 408. For example, the peak phase device 412 may include an inductor 412c that is operable to receive the power stored in the storage device 412a at the second voltage. One of skill in the art will recognize that this higher voltage power (relative to the power provided by the power system 402 to the standard phase devices 404, 406, and 410) applied to the inductor 412c will slew faster (relative to the standard phase devices 404, 406, and 408). In an embodiment, the fast slew rate from the transient phase inductor may result in a faster response by the processor voltage regulator, which is an additional benefit from operating at the higher stored voltage in the storage device 412a. This improved response may lessen the need for standard phases to assist the transient phase when dealing with peak load transients.

The controller 414 is operable to receive signals from a dynamic and/or peak power excursion detection system (e.g., located on a motherboard in an IHS, in a PSU in the power system, or elsewhere in the supplemental power system where dynamic and/or peak power excursion detection is performed) that indicate that the processor system is performing a dynamic and/or peak power excursion. While not illustrated, the dynamic and/or peak power excursion detection system may include subsystems that detect the current draw by processors in the processor system 410 on the power system 402, the current draw by the entire IHS (including the processor system 410) on the power system 402, and/or other operating conditions by the processor system 410 and/or IHS, compares those operating conditions to a power output capability of the power system 402, and if the operating conditions will cause the power system 402 to exceed its power output capability, instruct the controller 414 to activate the peak phase device 412 as discussed above. When no signal indicative of a dynamic and/or peak power excursion has been received by the controller 414, all of the standard phase devices 404, 406, or 408 are operated to supply power to the processor system 410 through the standard control 414a on the controller 414. When a signal indicative of a dynamic and/or peak power excursion has been received by the controller 414, the peak phase device 412 is operated to supply power (from the storage device 412a) to the processor system 410 through the peak control 414b on the controller 414. While single peak phase device 412 has been illustrated and described above, a plurality of peak phase devices similar to the peak phase device 412 may be provided to supply different levels of power for dynamic and/or peak power excursions of the processor system 410.

Figure 5:
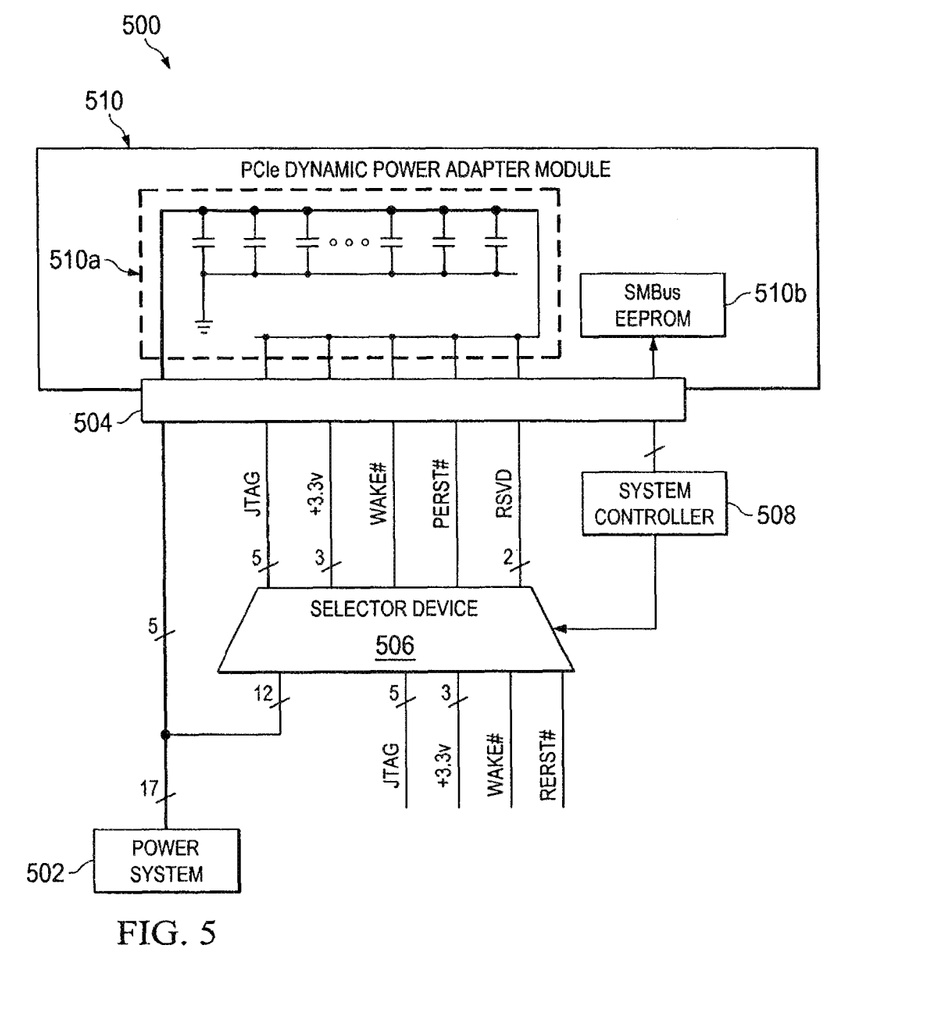
FIG. 5 is a schematic view illustrating an embodiment of a supplemental power system.

Referring now to FIG. 5, an embodiment of a supplemental power system 500 is illustrated. As discussed in further detail below, the supplemental power system 500 may be implemented as part of a variety of IHS's known in the art. For example, the supplemental power system 500 may be implemented as part of the IHS 100, discussed above with reference to FIG. 1, which may include a server IHS, a desktop IHS, a laptop IHS, a tablet IHS, a mobile phone IHS, and/or a variety of similar IHSs known in the art.

The embodiment of the supplemental power system 500 illustrated in FIG. 5 provides supplemental power via a removable module interface by repurposing that removable module interface to provide supplemental power for storage on a removable supplemental power module coupled to the removable module interface such that the supplemental power may be provided during dynamic and/or peak power excursions by one or more powered components in the supplemental power system 500. The supplemental power system 500 includes a power system 502 that may include any number or combination of power supply units (PSUs), power distribution units (PDUs), and/or other power system components known in the art. The power system 502 is coupled to a removable module interface 504 that, in the illustrated embodiment, is a Peripheral Component Interface express (PCIe) slot connector on an IHS. In an embodiment, the power system 502 is operable to provide power at a first voltage to the removable module interface 504. For example, the power system 502 may provide power at approximately +12 volts to the PCIe slot connector.

The removable module interface 504 may include a plurality of pins that provide power and communications signals from a processor system in the IHS to a module connected to the removable module interface 504. For example, a PCIe slot connector is provided with a plurality of pins including, but not limited to, five +12 volt power delivery pins, two reserved (RSVD) pins, five Joint Test Action Group (JTAG) pins (a test reset (TRST#) pin, a test clock (TCLK) pin, a test data input (TDI) pin, a test data out (TDO) pin, and a test memory system (TMS) pin), a WAKE# pin, three +3.3 volt pins, a PCIe reset (PERST#) pin, and a variety of other pins known by those of skill in the art.

The supplemental power system 500 also includes a selector device 506 that allows the supplemental power system 500 to switch between normal operation and enhanced power operation, discussed in further detail below. In an embodiment, the selector device 506 may include FETs, analog multiplexors, and/or other components for providing the functionality discussed herein. As can be seen in FIG. 5, the power system 502 includes five power connections to the five standard +12 volt power delivery pins on the removable component interface 504/PCIe slot connector, along with twelve power connections to the selector device 506, for a total of seventeen power connections from the power system 502. Five JTAG connections are coupled to the selector device 506 from the system (e.g., the IHS), and five JTAG connections connect the selector device 506 to the five JTAG pins on the removable module interface 504/PCIe slot connector. Three +3.3 volt connections are coupled to the selector device 506 from the system (e.g., the IHS), and three +3.3 volt connections connect the selector device 506 to the three +3.3 volt pins on the removable component interface 504/PCIe slot connector. A WAKE# connection is coupled to the selector device 506 from the system (e.g., the IHS), and a WAKE# connection connects the selector device 506 to the WAKE# pin on the removable module interface 504/PCIe slot connector. A PERST# connection is coupled to the selector device 506 from the system (e.g., the IHS), and a PERST# connection connects the selector device 506 to the PERST# pin on the removable module interface 504/PCIe slot connector. Two RSVD connections connect the selector device 506 to the two RSVD pins on the removable module interface 504/PCIe slot connector.

A system controller 508 is coupled to the selector device 506 and to the removable module interface 504 (e.g., through a System Management Bus (SMBus)). A removable supplemental power module 510 is operable to be coupled to and decoupled from the removable module interface 504. As is known in the art, the removable module interface 504 is operable to couple to a conventional removable module such as, for example, a removable module 510/PCIe card that may be coupled to the removable module interface 504/PCIe slot connector using methods known in the art. The removable supplemental power module 510 (the "PCIe Dynamic Power Adapter Module" in the illustrated embodiment) is similar to the conventional removable modules in that it includes edge fingers for coupling to the removable module interface 504, but differs from the conventional removable module in that it includes a supplemental power storage device 510a and a non-volatile memory 510b. In the illustrated embodiment, the supplemental power storage device 510a includes a plurality of capacitors that are coupled to the power system 502 and the selector device 506, and the non-volatile memory 510b includes a SMBus electronically erasable programmable read-only memory (EEPROM) that includes information that informs the system controller 508 that the module coupled to the removable module interface 504 is the removable supplemental power module 510 (e.g., rather than a conventional removable module.)

The supplemental power system 500 provides for conventional operation when a conventional removable module is coupled to the removable module interface 504. For example, when a conventional PCIe card (not illustrated) is coupled to the PCIe slot connector/removable module interface 504, the system controller 508 may detect the absence of an SMBus EEPROM (with PCIe Dynamic Power Adapter Module device type identifier) on the PCIe card and determine that the PCIe card is a conventional PCIe card. In response, the selector device 506 will provide for conventional operation of the removable module interface 504.

For example, in response to determining that the PCIe card is a conventional PCIe card, the selector device 506 may be configured to allow signals sent from the five JTAG connections coupled between the system and the selector device 506 to be provided to the JTAG pins on the PCIe slot connector/removable module interface 504 over the JTAG connections between the selector device 506 and the PCIe slot connector/removable module interface 504. In addition, the selector device 506 may be configured to allow power sent from the three +3.3 volt connections coupled between the system and the selector device 506 to be provided to the +3.3 v pins on the PCIe slot connector/removable module interface 504 over the +3.3 volt connections between the selector device 506 and the PCIe slot connector/removable module interface 504. In addition, the selector device 506 may be configured to allow signals sent from the WAKE# connection coupled between the system and the selector device 506 to be provided to the WAKE# pin on the PCIe slot connector/removable module interface 504 over the WAKE# connection between the selector device 506 and the PCIe slot connector/removable module interface 504. In addition, the selector device 506 may be configured to allow signals sent from the PERST# connection coupled between the system and the selector device 506 to be provided to the PERST# pin on the PCIe slot connector/removable module interface 504 over the PERST# connection between the selector device 506 and the PCIe slot connector/removable module interface 504. In addition, the selector device 506 may be configured to allow signals to be provided to the two RSVD pins on the PCIe slot connector/removable module interface 504 over the two RSVD connections between the selector device 506 and the PCIe slot connector/removable module interface 504. Thus, the twelve power connections between the power system 502 and the selector device 506 will not be used to provide power to the removable module interface 504 during conventional operation.

The supplemental power system 500 provides for enhanced/supplemental power operation when the removable supplemental power module 510 is coupled to the removable module interface 504. For example, when the removable supplemental power module 510 is coupled to the PCIe slot connector/removable module interface 504, the system controller 508 may read the non-volatile memory 510b on the removable supplemental power module 510 and determine that the removable supplemental power module 510 is an enhanced/supplemental power device. In response, the selector device 506 will provide for enhanced/supplemental power operation of the removable supplemental power module 510.

For example, in response to determining that the removable supplemental power module 510 is a supplemental power device, the selector device 506 may be configured to allows the twelve power connections between the power system 502 and the selector device 506 to provide power to the removable module interface 504 over the five JTAG connections from the selector device 506 to the five JTAG pins on the removable module interface 504, over the three +3.3 volt connections from the selector device 506 to the three +3.3 volt pins on the removable module interface 504, over the WAKE# connection from the selector device 506 to the WAKE# pin on the removable module interface 504, over the PERST# connection from the selector device 506 to the PERST# pin on the removable module interface 504, and over the two RSVD connections from the selector device 506 to the two RSVD pins on the removable module device 504.

Thus, in supplement power operation, the selector device 506 does not allow signals sent from the five JTAG connections coupled between the system and the selector device 506 to be provided to the JTAG pins on the PCIe slot connector/removable module interface 504 over the JTAG connections between the selector device 506 and the PCIe slot connector/removable module interface 504. In addition, the selector device 506 also does not allow power sent from the three +3.3 volt connections coupled between the system and the selector device 506 to be provided to the +3.3 v pins on the PCIe slot connector/removable module interface 504 over the +3.3 volt connections between the selector device 506 and the PCIe slot connector/removable module interface 504. In addition, the selector device 506 does not allow signals sent from the WAKE# connection coupled between the system and the selector device 506 to be provided to the WAKE# pin on the PCIe slot connector/removable module interface 504 over the WAKE# connection between the selector device 506 and the PCIe slot connector/removable module interface 504. In addition, the selector device 506 does not allow signals sent from the PERST# connection coupled between the system and the selector device 506 to be provided to the PERST# pin on the PCIe slot connector/removable module interface 504 over the PERST# connection between the selector device 506 and the PCIe slot connector/removable module interface 504. In addition, the selector device 506 does not allow signals to be provided to the two RSVD pins on the PCIe slot connector/removable module interface 504 over the two RSVD connections between the selector device 506 and the PCIe slot connector/removable module interface 504.

As discussed above, a standard PCIe slot connector includes five +12 volt power delivery pins, which at one amp per pin limits the PCIe slot connector to supplying approximately 60 watts of power (5 pins*1 amp*12 volts). The supplemental power system 500 is operable, in response to recognizing that a removable supplemental power module 510 has been coupled to a PCIe slot connector, to switch to a supplemental power mode that repurposes the pins on the PCIe slot connector to provide additional power to the removable supplemental power module 510. Pins suitable for repurposing may include those that are not associated with signal integrity concerns (e.g., those that do not transmit high speed signals), such as those in the illustrated example discussed above. In the illustrated embodiment, the supplemental power system 500 repurposes the pins on the removable component interface 504 to provide for 17+12 volt power pins on the removable module interface 504, allowing the PCIe slot connector to supply approximately 200 watts (17 pins*1 amp*12 volts). One of skill in the art will recognize that this repurposing may also reduce the parallel impedance of the power pins as well.

Stored supplemental power in the removable supplemental power module 510 coupled to the removable module interface 504 may be used for dynamic and/or peak power excursions by powered components such as, for example, processors in an IHS that includes the removable module interface. Using the example provided above, each PCIe slot connector in an IHS may support the dynamic and/or peak power excursions of approximately two processors with 100 watt TDPs and a 200 watt maximum peak power (e.g., each having a maximum peak power excursion capability of 100 watts above TDP.) As typical conventional server IHSs include 2-3 PCIe slot connectors per processor, many typical server IHS configurations will be supported while including removable supplemental power module(s) 510.

Figure 6:
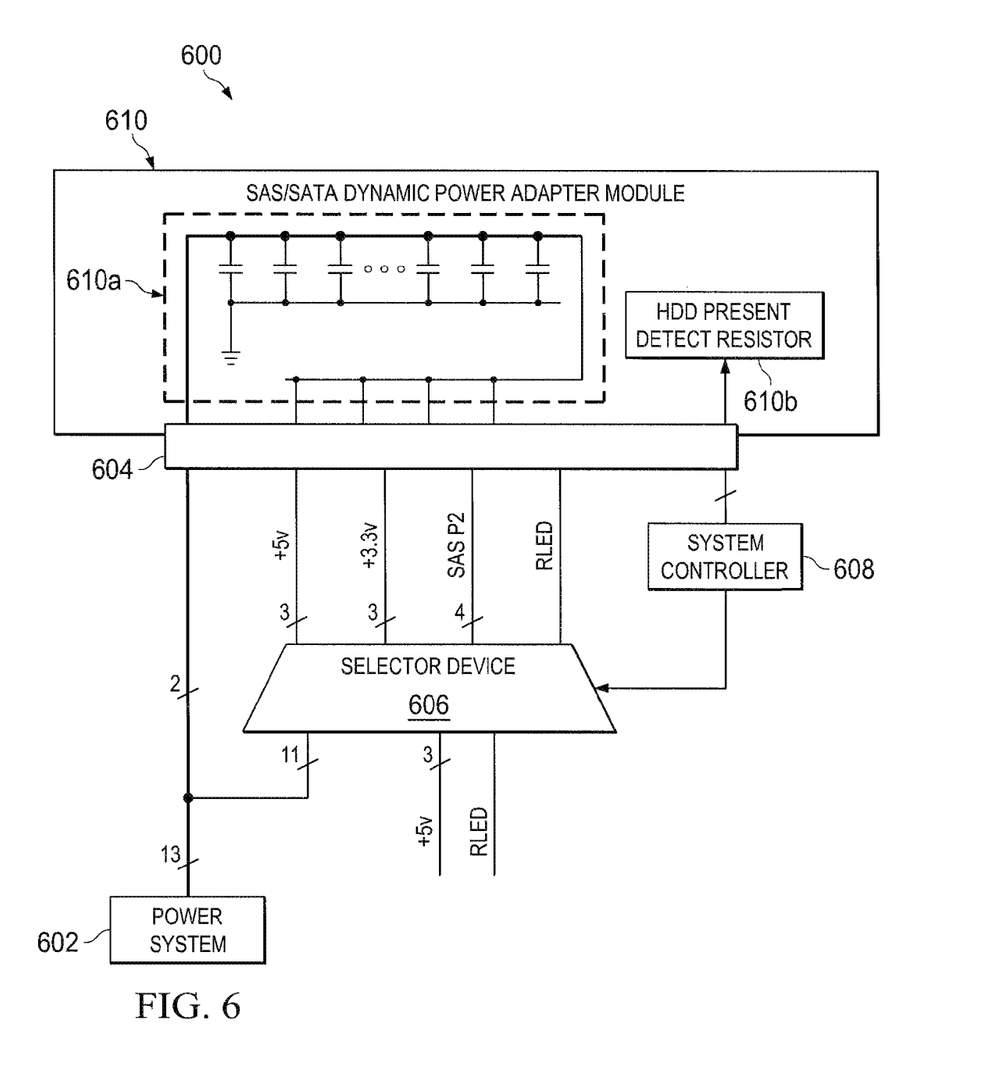
FIG. 6 is a schematic view illustrating an embodiment of a supplemental power system.

Referring now to FIG. 6, an embodiment of a supplemental power system 600 is illustrated. As discussed in further detail below, the supplemental power system 600 may be implemented as part of a variety of IHS's known in the art. For example, the supplemental power system 600 may be implemented as part of the IHS 100, discussed above with reference to FIG. 1, which may include a server IHS, a desktop IHS, a laptop IHS, a tablet IHS, a mobile phone IHS, and/or a variety of similar IHSs known in the art.

The embodiment of the supplemental power system 600 illustrated in FIG. 6 provides supplemental power via a removable module interface by repurposing that removable module interface to provide supplemental power during dynamic and/or peak power excursions by one or more powered components in the supplemental power system 600. The supplemental power system 600 includes a power system 602 that may include any number or combination of power supply units (PSUs), power distribution units (PDUs), and/or other power system components known in the art. The power system 602 is coupled to a removable module interface 604 that, in the illustrated embodiment, is a Serial-attached Small Computer System Interface (SCSI) (SAS)/Serial Advanced Technology Attachment (SATA) connector on an IHS. In an embodiment, the power system 602 is operable to provide power at a first voltage through the removable module interface 604. For example, the power system 602 may provide power at approximately 12 volts to the SAS/SATA connector.

The removable module interface 604 may include a plurality of pins that provide power and communications signals from a processor system in the IHS to a component connected to the removable module interface 604. For example, a SAS/SATA connector is provided with a plurality of pins including, but not limited to, two +12 volt power delivery pins, three +5 volt pins, three +3.3 volt pins, four secondary SAS port (SAS P2) pins, a light emitting diode ready (RLED) pin, and a variety of other pins known by those of skill in the art.

The supplemental power system 600 includes a selector device 606 that allows the supplemental power system 600 to switch between normal operation and enhanced power operation, discussed in further detail below. In an embodiment, the selector device 606 may include FETs, analog multiplexor, and/or other components for providing the functionality discussed herein. As can be seen in FIG. 6, the power system 602 includes two power connections to the two +12 volt power delivery pins on the removable module interface 504/SAS/SATA connector, along with eleven power connections to the selector device 506, for a total of thirteen power connections from the power system 602. Three +5 v connections are coupled to the selector device 606 from the system (e.g., the IHS), and three +5 volt connections connect the selector device 606 to the three +5 volt pins on the removable module interface 504/SAS/SATA connector. Three +3.3 volt connections connect the selector device 606 to the three +3.3 volt pins on the removable module interface 504/SAS/SATA connector. Four SAS P2 connections connect the selector device 606 to the four SAS P2 pins on the removable module interface 504/SAS/SATA connector. An RLED connection is coupled to the selector device 606 from the system (e.g., the IHS), and an RLED connection connects the selector device 606 to the RLED pin on the removable module interface 504/SAS/SATA connector.

A system controller 608 is coupled to the selector device 606 and to the removable module interface 604. A removable supplemental power module 610 is operable to be coupled to and decoupled from the removable module interface 604. As is known in the art, the removable module interface 604 is operable to couple to a conventional removable module such as, for example, a removable module 610/SAS/SATA drive that may be coupled to the removable module interface 604/SAS/SATA connector using methods known in the art. The removable supplemental power module 610 (the "SAS/SATA Dynamic Power Adapter Module" in the illustrated embodiment) is similar to the conventional removable modules in that it includes a connector for coupling to the removable module interface 604, but differs from the conventional removable module in that it includes a supplemental power storage device 610*a* and a detect component 610*b*. In the illustrated embodiment, the supplemental power storage device 610*a* includes a plurality of capacitors that are coupled to the power system 602 and the selector device 606, and the detect component 610*b* includes a hard disk drive (HDD) present detect resistor that informs the system controller 608 that the component coupled to the removable module interface 604 is the removable supplemental power module 610 (e.g., rather than a conventional removable module.)

The supplemental power system 600 provides for conventional operation when a conventional removable module is coupled to the removable module interface 604. For example, when a conventional SAS/SATA drive (not illustrated) is coupled to the SAS/SATA connector/removable module interface 604, the system controller 608 may determine from the HDD present detect resistor on the SAS/SATA drive that the SAS/SATA drive is a conventional SAS/SATA drive. In response, the selector device 606 will provide for conventional operation of the removable module interface 604.

For example, in response to determining that the SAS/SATA drive is a conventional SAS/SATA drive, the selector device 606 may be configured to allow power sent from the three +5 volt connections coupled between the system and the selector device 606 to be provided to the +5 volt pins on the SAS/SATA connector/removable module interface 604 over the +5 volt connections between the selector device 606 and the SAS/SATA connector/removable module interface 504. In addition, the selector device 606 may be configured to allow power to be provided to the +3.3 v pins on the SAS/SATA connector/removable module interface 604 over the +3.3 volt connections between the selector device 606 and the SAS/SATA connector/removable module interface 604. In addition, the selector device 506 may be configured to allow signals to be provided to the four SAS P2 pins on the SAS/SATA connector/removable module interface 604 over the four SAS P2 connections between the selector device 506 and the SAS/SATA connector/removable module interface 604. In addition, the selector device 506 may be configured to allow signals sent from the RLED connection coupled between the system and the selector device 606 to be provided to the RLED pin on the SAS/SATA connector/removable module interface 604 over the RLED connection between the selector device 606 and the SAS/SATA connector/removable module interface 604. Thus, the eleven power connections between the power system 602 and the selector device 606 will not be used to provide power to the removable module interface 604 during conventional operation.

The supplemental power system 600 provides for enhanced/supplemental power operation when the removable supplemental power module 610 is coupled to the removable module interface 604. For example, when the removable supplemental power module 610 is coupled to the SAS/SATA connector/removable module interface 604, the system controller 608 may determine from the HDD present detect resistor (e.g., via measuring or detecting a specific resistance value different from that used on a standard SAS/SATA drive) that the removable supplemental power module 610 is an enhanced/supplemental power device. In response, the selector device 606 will provide for enhanced/supplemental power operation of the removable module interface 604.

For example, in response to determining that the removable supplemental power module 610 is a supplemental power device, the selector device 606 may be configured to allow the eleven power connections between the power system 602 and the selector device 606 to provide power to the removable module interface 604 over the three +5 volt connections from the selector device 606 to the three +5 volt pins on the removable module interface 604, over the three +3.3 volt connections from the selector device 606 to the three +3.3 volt pins on the removable module interface 604, over the four SAS P2 connections from the selector device 606 to the four SAS P2 pins on the removable module interface 604, and over the RLED connection from the selector device 606 to the RLED pin on the removable module interface 604.

Thus, in supplemental power operation, the selector device 606 does not allow power sent from the three +5 volt connections coupled between the system and the selector device 606 to be provided to the three +5 volt pins on the SAS/SATA connector/removable module interface 604 over the +5 volt connections between the selector device 606 and the SAS/SATA connector/removable module interface 604. In addition, the selector device 606 also does not allow power to be provided to the +3.3 v pins on the SAS/SATA connector/removable module interface 604 over the +3.3 volt connections between the selector device 606 and the SAS/SATA connector/removable module interface 604. In addition, the selector device 606 does not allow signals to be provided to the four SAS P2 pins on the SAS/SATA connector/removable module interface 604 over the four SAS P2 connections between the selector device 606 and the SAS/SATA connector/removable module interface 604. In addition, the selector device 506 does not allow signals sent from the RLED connection coupled between the system and the selector device 606 to be provided to the RLED pin on the SAS/SATA connector/removable module interface 604 over the RLED connection between the selector device 606 and the SAS/SATA connector/removable module interface 604.

As discussed above, a standard SAS/SATA connector includes two +12 volt power delivery pins, which at 1.5 amps per pin limits the SAS/SATA connector to supplying approximately 36 watts of power (2 pins*1.5 amps*12 volts). The supplemental power system 600 is operable, in response to recognizing that a removable supplemental power module 610 has been coupled to a SAS/SATA connector, to switch to a supplemental power mode that repurposes the pins on the SAS/SATA connector to provide additional power from the removable supplemental power module 610. Pins suitable for repurposing may include those that are not associated with signal integrity concerns (e.g., those that do not transmit high speed signals), such as those in the illustrated example discussed above. In the illustrated embodiment, the supplemental power system 600 repurposes the pins on the removable module interface 604 to provide for thirteen +12 volt pins on the removable module interface 604, allowing the SAS/SATA connector to supply approximately 230 watts (13 pins*1.5 amp*12 volts). One of skill in the art will recognize that this repurposing may also reduce the parallel impedance of the power pins as well.

Stored supplemental power in the removable supplemental power module 610 coupled to the removable module interface 604 may be used for dynamic and/or peak power excursions by powered components such as, for example, processors in an IHS that includes removable module interface. Using the example provided above, each SAS/SATA connector in an IHS may support the dynamic and/or peak power excursions of approximately two processors with 100 watt TDPs and a 200 watt maximum peak power (e.g., each having a maximum peak power excursion capability of 100 watts above TDP.) As typical conventional server IHSs include 4-8 drive bay slots (with connectors) per processor, many typical server IHS configurations will be supported while including removable supplemental power module(s) 510.

In yet another embodiment, a PCIe Solid State Device (SSD) Universal Drive Slot may have its pins repurposed to provide supplemental power similarly as discussed above for the PCIe slot connector and SAS/SATA connectors with reference to FIGS. 5 and 6. A PCIe SSD Universal Drive Slot includes interfaces for both PCIe and SAS/SATA, and thus may repurpose similar pins to those discussed above. Furthermore, the removable supplemental power module may be identified via the SMBus or a presence detect interface substantially as described above as well.

Figure 7:
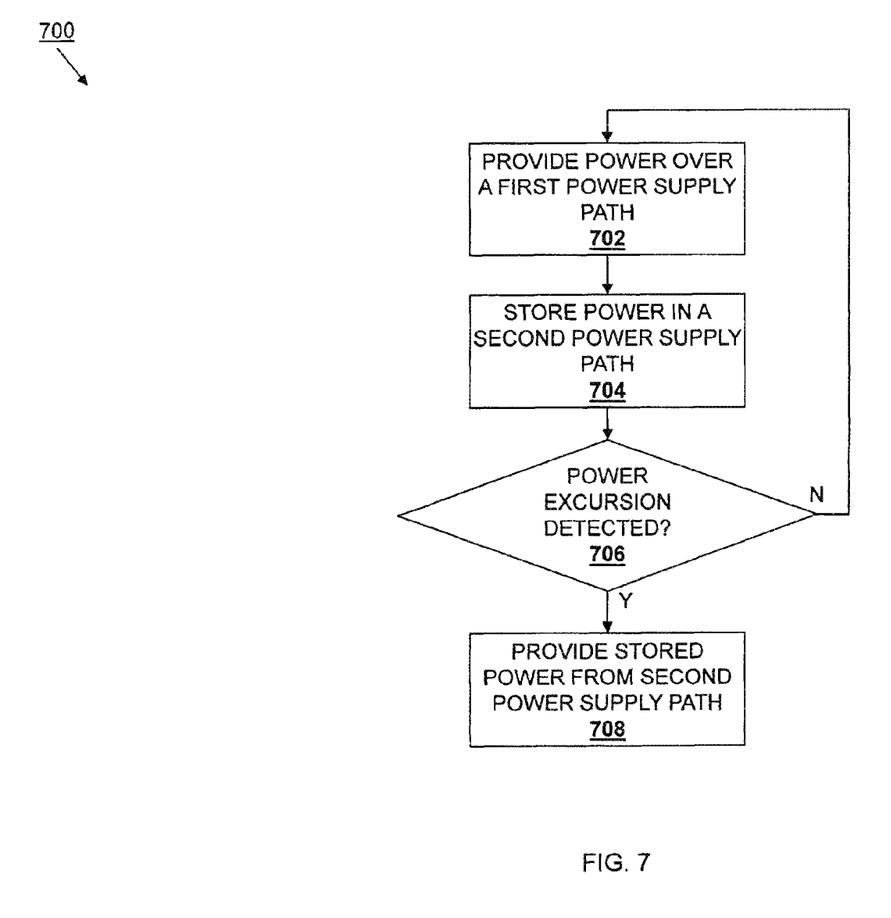
FIG. 7 is a flow chart illustrating an embodiment of a method for providing supplemental power.

Referring now to FIG. 7, a method 700 for providing supplemental power is illustrated. As discussed further below, the method 700 may be performed using any of the supplemental power systems 200, 300, 400, 500, or 600, discussed above. The method 700 begins at block 702 where power is provided over a first power supply path. In the embodiment of the supplemental power system 200 illustrated in FIG. 2, the power system 202 provides power at a first voltage (e.g., approximately 12 volts) for use by the processor system 206, the memory system 208, and the other systems 210 over the first power supply path 204. In the embodiment of the supplemental power system 300 illustrated in FIG. 3, the primary power output 302a in the power system 302 provides power at a first voltage (e.g., approximately 12 volts) for use by the processor system 306, the memory system 308, and the other systems 310 over the first power supply path 304. In the embodiment of the supplemental power system 400 illustrated in FIG. 4, the power system 402 provides power for use by the processor system 410, through one of the standard phase devices 404, 406, or 408 using the standard control 414a in the controller 414. In the embodiment of the supplemental power system 500 illustrated in FIG. 5, the power system 502 provides power to an IHS over a first power supply path (not illustrated, but similar to the first power supply path to the IHS components that may include a processor system, a memory system, and other systems similar to those discussed in FIGS. 2 and 3.) In the embodiment of the supplemental power system 600 illustrated in FIG. 6, the power system 602 provides power to an IHS (not illustrated, but similar to the first power supply path to the IHS components a processor system, a memory system, and other systems similar to those discussed in FIGS. 2 and 3.)

The method 700 then proceeds to block 704 where power is stored in a second power supply path. In the embodiment of the supplemental power system 200 illustrated in FIG. 2, the power system 202 provides power at a first voltage (e.g., approximately 12 volts) to the second power supply path 212, and the boost converter 214 increases the voltage of that power to a second voltage (e.g., to approximately 48 volts)

and provides that power for storage in the storage device 216. In the embodiment of the supplemental power system 300 illustrated in FIG. 3, the supplemental power output 302b in the power system 302 provides power at a second voltage (e.g., approximately 18-48 volts) to the second power supply path 312, and that power is stored in the storage device 316. In the embodiment of the supplemental power system 400 illustrated in FIG. 4, the power system 402 provides power to the peak phase device 412, and that power is stored in the storage device 412a. In the embodiment of the supplemental power system 500 illustrated in FIG. 5, in response to the removable supplemental power module 510 being coupled to the removable module interface 504, the system controller 508 will detect the removable supplemental power module 510 (e.g., through information retrieved from the non-volatile memory 510a) and set the selector device 506 to repurpose the pins on the removable module interface 504 to provide power (e.g., +12 volt power) from the power system 502 to the supplemental power storage device 510a on the removable supplemental power module 510, as discussed above. In the embodiment of the supplemental power system 600 illustrated in FIG. 6, in response to the removable supplemental power module 610 being coupled to the removable module interface 604, the system controller 608 will detect the removable supplemental power module 610 (e.g., through the detect component 610a) and set the selector device 606 to repurpose the pins on the removable module interface 604 to provide power (e.g., +12 volt power) from the power system 602 to the supplemental power storage device 610a on the removable supplemental power module 610, as discussed above.

The method 700 then proceeds to decision block 706 where the system is monitored to determine whether a power excursion is occurring and, if so, to block 708 where stored power is provided from the second power supply path. In the embodiment of the supplemental power system 200 illustrated in FIG. 2, a dynamic and/or peak power excursion by a powered component in the system (e.g., by a processor in the processor system 206, a memory device in the memory system 208, or another system component in the other systems 210) will cause a drop in voltage on the first power supply path 204, which will then create a voltage differential that allows power stored in the storage device 216 to be provided to the buck converter 218 to reduce the power back to the first voltage, and then through the OR device 220 in the second power supply path 212 to the powered components. In the embodiment of the supplemental power system 300 illustrated in FIG. 3, a dynamic and/or peak power excursion by a powered component in the system (e.g., by a processor in the processor system 306, a memory device in the memory system 308, or another system component in the other systems 310) will cause a drop in voltage on the first power supply path 304, which will then create a voltage differential that allows power stored in the storage device 314 to be provided to the voltage regulator 316 to reduce the power back to the first voltage, and then through the OR device 318 in the second power supply path 312 to the powered components.

In the embodiment of the supplemental power system 400 illustrated in FIG. 4, a dynamic and/or peak power excursion by a powered component in the system (e.g., by a processor in the processor system 410) will be detected by a dynamic and/or peak power excursion detection system (not illustrated) and cause the controller 414 to use the peak control 414b to activate the peak phase device 412 to provide power stored in the storage device 412a to the processor system 410. While not illustrated, the dynamic and/or peak power excursion detection system may include subsystems that detect the current draw by processors in the processor system 410 on the power system 402, the current draw by the entire IHS (including the processor system 410) on the power system 402, and/or other operating conditions by the processor system 410 and/or IHS, compares those operating conditions to a power output capability of the power system 402, and if the operating conditions will cause the power system 402 to exceed its power output capability, instruct the controller 414 to activate the peak phase device 412 as discussed above.

In the embodiment of the supplemental power system 500 illustrated in FIG. 5, a dynamic and/or peak power excursion by a powered component in the system (e.g., by a processor in a processor system powered by the power system 502, by a memory device in a memory system powered by the power system 502, and/or by other devices in other systems powered by the power system 502) will be detected by a dynamic and/or peak power excursion detection system (not illustrated) and cause the removable supplemental power module 510 to provide power stored in the supplemental power storage device 510a to the powered components in the system. In the embodiment of the supplemental power system 600 illustrated in FIG. 6, a dynamic and/or peak power excursion by a powered component in the system (e.g., by a processor in a processor system powered by the power system 602, by a memory device in a memory system powered by the power system 602, and/or by other devices in other systems powered by the power system 602) will be detected by a dynamic and/or peak power excursion detection system (not illustrated) and cause the removable supplemental power module 610 to provide power stored in the supplemental power storage device 610a to the powered components in the system. While not illustrated, the dynamic and/or peak power excursion detection system may include subsystems that detect the current draw by powered components powered by the power systems 502 or 602, the current draw by the entire IHS (including the powered components powered by the power systems 502 or 602) on the power system 402, and/or other operating conditions by the powered components powered by the power systems 502 or 602, compares those operating conditions to a power output capability of the power systems 502 or 602, and if the operating conditions will cause the systems 502 or 602 to exceed its power output capability, instruct the removable supplement power modules 510 or 610 to provide the power stored in the supplemental power storage devices 510a or 610a as discussed above. For example, the power pins on the removable supplement power module may be connected to an OR'ing device (e.g., a diode or FET) similarly as described above, and when the voltage drop across the OR'ing device is great enough, current will flow into the system.

In any of the embodiments of the supplemental power systems discussed above, the storage devices for storing supplemental power may be selected such that they can be recharged quickly during a duty cycle including time periods when there is no dynamic and/or peak power excursion occurring (an "off" time). For example, a maximum peak power excursion may be "on" 20% of the time and "off" 80% of the time, and a maximum dynamic power excursion may be "on" 25% of the time and "off" 75% of the time, and the storage devices for storing supplemental power may be selected such that they are charged sufficiently during "off" times and can provide power during "on" times sufficient to power the components and prevent shut-down or other negative effects on the power system. In another example, a storage device for storing supplemental power may be a 180 µF, 50 volt capacitor that is used to supply 100 watts of supplemental +12 volt power for 2 ms, and at the end of the 2 ms "on" time, that capacitor will be drawn down to approximately 15 volts. It will then take approximately 8.7 ms to recharge that capacitor to the full 50 volts during the "off" time. Thus, such a storage device could be used to support a 100 watt TDP processor peak power transient of 100% over TDP (up to 200 watts) at an approximate duty cycle of 19%. While a specific example has been provided, one of skill in the art will recognize that proper selection of capacitor features will allow any duty cycles of interest to be supported with a reasonable storage device implementation.

In any of the embodiments of the supplemental power systems discussed above, the storage devices for storing supplemental power may be selected such that they include an impedance that is approximately equal to that of the power system (e.g., a PSU in the power system) in order to provide current flow and meet any sharing requirements. In some embodiments, depending on the details of the impedance, impedance devices (e.g., ORing diodes, FETs, or other suitable devices) may be included in the power supply paths.

In some embodiments of the supplemental power systems discussed above, PSU(s) in the power system or other voltage rails may be boosted by a factor of 2-4 times (e.g., a voltage of 12 volts boosted to 24-48 volts) to support increased energy storage capacity. Boost converters used to increase energy storage capacity may add a nominal load on the power system and reduce the overall power efficiency slightly. In some embodiments, those boost converters may be powered down when the system configuration does not require supplemental power to meet dynamic and/or peak power excursions. For example, the system configuration may be retrieved at power up and compared to the power output capabilities of the power system, and if the system configuration will cause the power system to exceed its power output capabilities, the supplemental power system will be enabled, while if the system configuration will not cause the power system to exceed its power output capabilities, the supplemental power system will be disabled.

The systems and methods of the present disclosure provide substantial benefits with regard to hold-up times as well as the provision of supplemental power during dynamic and/or peak power excursions. As is known in the art, hold-up times are the time periods after power to the system is cut off in which power is still stored in the system and provided to the system components. Some IHSs, such as server IHSs, have been reducing hold-up time capability over the past several years due to, for example, challenges of fitting the necessary storage elements inside the power system, smaller physical power system volumes, and higher output capacity points. These reduced hold-up time capabilities are driven by a prioritization of volume for other subsystems within server IHSs along with greater output loads required by the power systems. For example, the power density of PSUs has tripled over the last 3 server generations (over a time period of approximately 6 years). The result has been a hold-up time reduction to hold-up times of approximately 10 ms at full load, which is the minimum hold-up time that will allow a PDU to switch over from a main power rail to a redundant power rail while tolerating AC line disturbances that might occur. One of skill in the art will recognize that the systems and methods of the present disclosure provide for an increase in the hold-up time of a system in which they are included, and can provide an order of magnitude increase for users that need a greater hold-up time than provided by their base power system. The embodiments illustrated and described with reference to FIGS. 5 and 6 may be particularly suited for increased hold-up times, and the base system need not be burdened with supporting the increased hold-up time, and removable supplement power components may then be coupled to unused removable component interfaces to provide the needed increase in hold-up time.

Thus, systems and methods have been described for providing supplemental power to a powered system during dynamic and/or peak power excursions by one or more powered components in that powered system. Such systems and methods allow for a power system that is designed to handle the average power requirements of the powered system, and thus result in less costly and more efficient power system, while also providing for supplemental power during dynamic and/or peak power excursions that can exceed the power output capabilities of the power system but that occur relatively infrequently.

Although illustrative embodiments have been shown and described, a wide range of modification, change and substitution is contemplated in the foregoing disclosure and in some instances, some features of the embodiments may be employed without a corresponding use of other features. Accordingly, it is appropriate that the appended claims be construed broadly and in a manner consistent with the scope of the embodiments disclosed herein.

What is claimed is:

1. A supplemental power system, comprising:
   at least one powered component;
   a removable module interface that includes a plurality of pins that are configured to couple to a removable module;
   a selector device that is coupled to the at least one powered component, the removable module interface, and each of a plurality of system connections; and
   a system controller that is coupled to the removable module interface and the selector device, wherein the system controller is configured to:
      detect that a first type removable module has been coupled to the removable module interface and, in response, configure the selector device to allow signals sent from the system connections to be transmitted to the first type removable module through the plurality of pins on the removable module interface;
      detect that a second type removable module has been coupled to the removable module interface that is different than the first type removable module and, in response, configure the selector device to allow power that is stored in the second type removable module and received through the plurality of pins on the removable module interface to be transmitted to the at least one powered component while not allowing signals sent from the system connections to be transmitted to the second type removable module through the plurality of pins on the removable module interface; and
      in response to a detected power excursion by the at least one powered component, provide power that is stored in the second type removable module and received through the plurality of pins on the removable module interface to the at least one powered component.

2. The system of claim 1, wherein the removable module interface is a Peripheral Component Interconnect (PCI) interface.

3. The system of claim 2, wherein the system controller is configured to detect that the second type removable module has been coupled to the removable module interface in response to retrieving information through the PCI interface from a non-volatile memory in the second type removable module.

4. The system of claim 1, wherein the removable module interface is a storage device interface.

5. The system of claim 4, wherein the system controller is configured to detect that the second type removable module has been coupled to the removable module interface in response to detecting a resistance in the second type removable module.

6. The system of claim 1, wherein the removable module interface is a solid state device drive interface.

7. The system of claim 1, wherein the plurality of pins include at least one communication delivery pin that is configured to transmit communication signals to the first type removable module, and wherein the at least one communication delivery pin is configured to be repurposed by the selector device to transmit power from the second type removable module.

8. An information handling system (IHS), comprising:
a processing system;
a removable module interface that includes a plurality of pins that are configured to couple to a removable module;
a selector device that is coupled to the processing system and the first removable module interface; and
a system controller that is coupled to the first removable module interface and the selector device, wherein the system controller is configured to:
 detect that a first type removable module has been coupled to the first removable module interface and, in response, configure the selector device to allow signals sent from the processing system to be transmitted to the first type removable module through the plurality of pins on the first removable module interface;
 detect that a second type removable module has been coupled to the first removable module interface that is different than the first type removable module and, in response, configure the selector device to allow power that is stored in the second type removable module and received through the plurality of pins on the first removable module interface to be transmitted to the processing system; and
 in response to a detected power excursion by the processing system, provide power that is stored in the second type removable module and received through the plurality of pins on the removable module interface to the processing system.

9. The IHS of claim 8, wherein the removable module interface is a Peripheral Component Interconnect (PCI) interface.

10. The IHS of claim 9, wherein the system controller is configured to detect that the second type removable module has been coupled to the removable module interface in response to retrieving information through the PCI interface from a non-volatile memory in the second type removable module.

11. The IHS of claim 8, wherein the removable module interface is a storage device interface.

12. The IHS of claim 11, wherein the system controller is configured to detect that the second type removable module has been coupled to the removable module interface in response to detecting a resistance in the second type removable module.

13. The IHS of claim 8, wherein the removable module interface is a solid state device drive interface.

14. The IHS of claim 8, wherein the plurality of pins include at least one communication delivery pin that is configured to transmit communication signals to the first type removable module, and wherein the at least one communication delivery pin is configured to be repurposed by the selector device to transmit power from the second type removable module.

15. A method for providing supplemental power, comprising:
 detecting that a first type removable module has been coupled to a removable module interface;
 configuring a selector device to allow signals sent from system connections to be transmitted to the first type removable module through a plurality of pins on the removable module interface;
 detecting that a second type removable module has been coupled to the removable module interface that is different than the first type removable module;
 configuring a selector device to allow power that is stored in the second type removable module and received through the plurality of pins on the removable module interface to be transmitted to at least one powered component while not allowing signals sent from the system connections to be transmitted to the second type removable module through the plurality of pins on the removable module interface; and
 in response to a detected power excursion by the at least one powered component, providing power that is stored in the second type removable module and received through the plurality of pins on the removable module interface to the at least one powered component.

16. The method of claim 15, wherein the removable module interface is a Peripheral Component Interconnect (PCI) interface.

17. The method of claim 16, wherein the detecting that the second type removable module has been coupled to the removable module interface includes retrieving information through the PCI interface from a non-volatile memory in the second type removable module.

18. The method of claim 15, wherein the removable module interface is a storage device interface.

19. The method of claim 18, wherein the detecting that the second type removable module has been coupled to the removable module interface includes detecting a resistance in the second type removable module.

20. The method of claim 15, wherein the plurality of pins include at least one communication delivery pin that is configured to transmit communication signals to the first type removable module, and wherein the method further includes:
 repurposing the at least one communication delivery pin to transmit power from the second type removable module.

* * * * *